United States Patent
Eid et al.

(10) Patent No.: US 9,449,238 B2
(45) Date of Patent: Sep. 20, 2016

(54) AUGMENTED IMAGE CORRELATION

(71) Applicant: Lexmark International, Inc., Lexington, KY (US)

(72) Inventors: Ahmed Hamad Mohamed Eid, Lexington, KY (US); Tomasz Jan Cholewo, Lexington, KY (US); Edward Earl Rippetoe, II, Georgetown, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 55 days.

(21) Appl. No.: 14/266,057

(22) Filed: Apr. 30, 2014

(65) Prior Publication Data

US 2015/0317533 A1 Nov. 5, 2015

(51) Int. Cl.
| | |
|---|---|
| G06K 9/46 | (2006.01) |
| G06K 9/18 | (2006.01) |
| G06K 9/62 | (2006.01) |
| G06K 9/20 | (2006.01) |

(52) U.S. Cl.
CPC ............... *G06K 9/18* (2013.01); *G06K 9/2063* (2013.01); *G06K 9/46* (2013.01); *G06K 9/468* (2013.01); *G06K 9/62* (2013.01); *G06K 9/6202* (2013.01); *G06K 9/6215* (2013.01); *G06K 2209/01* (2013.01)

(58) Field of Classification Search
USPC ............... 382/190, 278, 282, 284, 293, 209; 358/537, 538, 450, 540
See application file for complete search history.

(56) References Cited

U.S. PATENT DOCUMENTS

| | | | | |
|---|---|---|---|---|
| 6,453,056 | B2 * | 9/2002 | Laumeyer | G06K 9/00818 340/933 |
| 7,305,124 | B2 * | 12/2007 | Zhao | G06K 9/00234 382/162 |
| 8,041,103 | B2 * | 10/2011 | Kulkarni | G06F 17/5045 382/144 |
| 8,050,466 | B2 * | 11/2011 | Corcoran | G06K 9/00275 382/118 |
| 8,050,519 | B2 * | 11/2011 | Katsumata | A61B 1/0676 382/284 |
| 8,071,949 | B2 * | 12/2011 | Majewski | A61B 6/037 250/363.05 |
| 8,155,452 | B2 * | 4/2012 | Minear | G06K 9/741 382/181 |
| 8,195,003 | B2 * | 6/2012 | Rosman | G06T 5/006 382/255 |
| 8,284,432 | B2 * | 10/2012 | Migishima | H04N 1/1903 358/1.15 |
| 8,682,077 | B1 * | 3/2014 | Longacre, Jr. | G06K 9/6201 382/176 |

OTHER PUBLICATIONS

"Feature Detection (computer vision)"; https://en.wikipedia.org/wiki/Feature_detection_(computer_vision); printed Mar. 20, 2014; pp. 5.
"Object Detection in a Cluttered Scene Using Point Feature Matching"; http://www.mathworks.com/help/vision/examples/objects-detection-in-a-cluttered-scene-using-point-feature-matching.html?prodcode=VP&language=en#zmw57dd; printed Apr. 16, 2014; pp. 9.
"Template Matching"; http://en.wikipedia.org/wiki/Template_matching; printed Apr. 9, 2014; pp. 6.
"Template Matching-Temple University"; https://www.google.com/search?q=what+do+templates+do%3F&oq; printed Apr. 9, 2014; pp. 21.

* cited by examiner

*Primary Examiner* — Yosef Kassa (57) ABSTRACT

Systems and methods search pixels of source images and compare them to pixels of templates. Best matches correlate to objects in the image. That environmental conditions impact the appearance of objects, best matching scores suffer under poor lighting and other adverse conditions. Improving scores includes augmenting traditional correlation techniques with object features extracted from the source image and matching them to templates corresponding to the features. Certain embodiments contemplate corrupting pixels of image templates corresponding to objects with pixels extracted from the source image corresponding to features. Representative features include corners, edges, ridges, points/regions of interest, etc. Other embodiments note augmented correlation as a computing application and computing devices therefore, including cameras for capturing images and displaying results to users.

20 Claims, 8 Drawing Sheets

AUGMENTED IMAGE CORRELATION

FIELD OF THE EMBODIMENTS

The present disclosure relates to object recognition in images defined by pixels. The disclosure relates further to correlating objects to templates and augmenting it with features extracted from the images and correlated to features templates. Augmented correlation computing applications, computing devices and processing techniques typify the embodiments. Modification of templates with extracted features defines still other embodiments.

BACKGROUND

Although not precisely defined, object recognition in computing technology involves the task of detecting and identifying items, such as letters, numbers, faces, fingerprints, humans, animals, buildings, vehicles, etc. in images (still pictures or video). Recognition is often used in computer vision and digital image processing environments for reasons related to security, surveillance, banking, rules enforcement, robotics, manufacturing, pattern matching, medical image processing, and the like. It is common to search pixels of a source image for objects and correlate them to predefined templates that characterize the shapes of the objects or that specify other identifying features. The object-template pair with the highest correlation/matching score provides the basis for recognizing the objects under consideration.

Figure 1A:
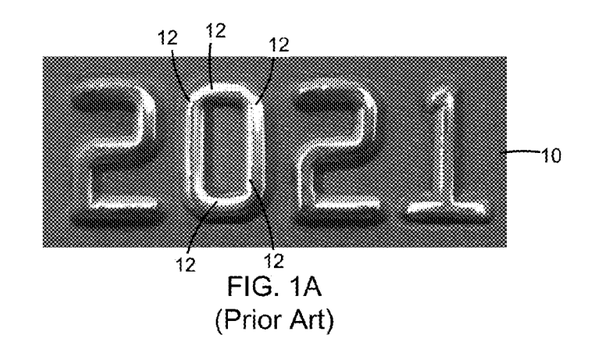
FIGS. 1(a)-1(c) are captures of images having objects in the form of numerals embossed as digits on a banking card.
Figure 1B:
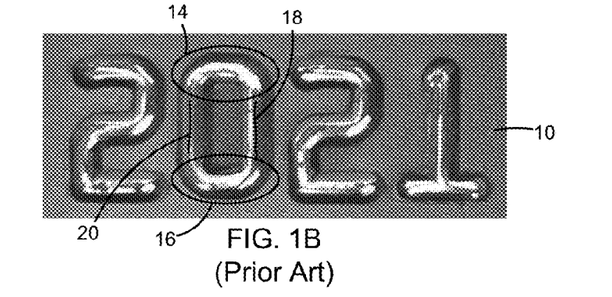
Figure 1C:
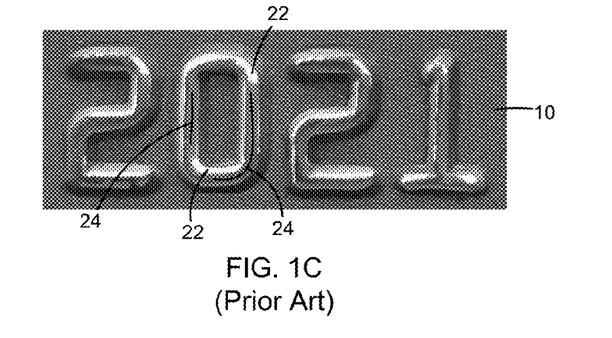
Figure 1D:
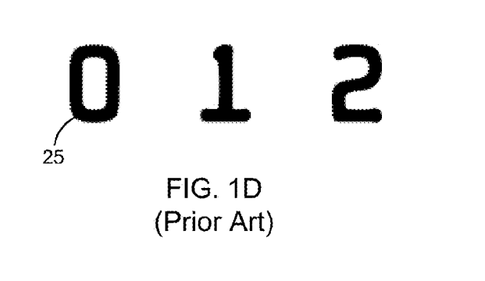
FIGS. 1(d)-1(e) are templates according to the prior art for matching the objects of FIGS. 1(a)-1(c)
Figure 1E:
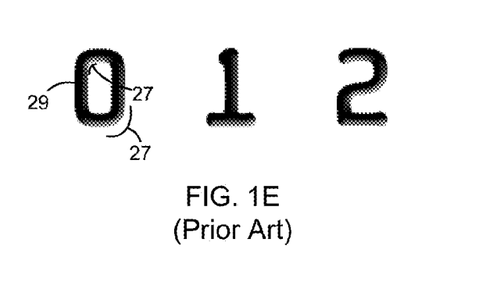

With dynamic changes to environment, such as changes in lighting, lighting source direction, weather, background, etc., the same objects appearing in multiple images can appear significantly different from their corresponding templates. In turn, object-template pairs often have varying correlation/matching scores which reduces the likelihood of successfully identifying objects in images. For example, FIGS. 1(a)-1(c) show similar image captures of embossed digits (2-0-2-1) of a banking card 10, each under various lighting conditions. The digit "0" in FIG. 1(a) reveals a high gloss exterior 12 but only has glossy portions near a top 4 and bottom 16 in FIG. 1(b) coupled with very dark regions on sides 18, 20. In FIG. 1(c), both glossy regions 22 and moderately dark regions 24 are intermixed around the exterior of the digit. In FIGS. 1(d) and 1(e), templates are noted for matching the digits in the images of FIGS. 1(a)-1(c). For digit "0," the template in FIG. 1(d) appears nearly dark 25 everywhere, while regions of light 27 reside interspersed with regions of dark 29 in the template in FIG. 1(e). Neither template matches exactly to the digit "0" in the images.

Since advanced recognition systems seek to identify these objects under changing conditions, modeling processes regularly introduce complex and time-consuming techniques to counter these effects. As noted generally in the art at http://en.wikipedia.org/wiki/Template_matching, for example, improvements can be made to the matching method by using more than one template (eigenspaces), especially contemplating different scales and rotations. Yet, these models are impractical given that changes in environmental conditions are often unpredictable.

What is needed are techniques to augment traditional correlation to ensure better recognition of objects in images. This includes better matching, fitting, etc. of objects to their templates, especially under changing conditions of light, background, skew, orientation, etc., to give a higher level of confidence that correlation is achieved between objects and their templates. Further needs also contemplate instructions or software executable on controller(s) in hardware for reliably performing the same. Additional benefits and alternatives are sought when devising solutions.

SUMMARY

The above-mentioned and other problems are solved by methods and apparatus for augmented image correlation. Techniques include traditional image correlation techniques augmented with correlation from delimiting object features extracted from images matched to corresponding feature templates. Augmentation enhances the overall template matching process by way of a combined traditional/augmented correlation score. It is an advantage that exploits appearance variation of objects in images to enhance object recognition.

In a representative embodiment, systems and methods search pixels of source images and compare them to pixels of templates. Best matches correlate to objects in the image. That environmental conditions impact the appearance of objects, best matching scores suffer under poor lighting and other adverse conditions. Improving scores includes augmenting traditional correlation techniques with object features extracted from the source image and matching them to templates corresponding to the features. Certain embodiments contemplate corrupting pixels of image templates corresponding to objects with pixels extracted from the source image corresponding to features. In this way, better matches are found for objects as non-matching templates have worse matching scores than before. Representative features include corners, edges, ridges, points/regions of interest, etc. Other embodiments note augmented correlation as a computing application and computing devices therefore, including cameras for capturing images and displaying results to users.

Computing devices, such as tablets, smart phones, imaging devices, etc. have controllers with augmented correlation applications hosted thereon. Alternatively, the applications reside on computer readable media, such as disks, USB sticks, etc., or may be downloaded from non-fleeting memory of other computing devices, such as computing servers reachable from the internet at large or an "app store," for instance. Other systems and methods include devices with integrated cameras to capture source images, be it photos or videos, wherein images get acted upon by the computing application to determine objects and display them to users. Refined embodiments of the disclosure contemplate application integration as part of optical character recognition (OCR) application for mobile-device image captures. In this way, devices provide real time, fast and accurate recognition of digits on banking cards as input to downstream banking applications that require limited-set character recognition, such as automatic, vision-based credit card readers or check deposit/withdrawal.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach augmented image correlation.

Figure 2A:
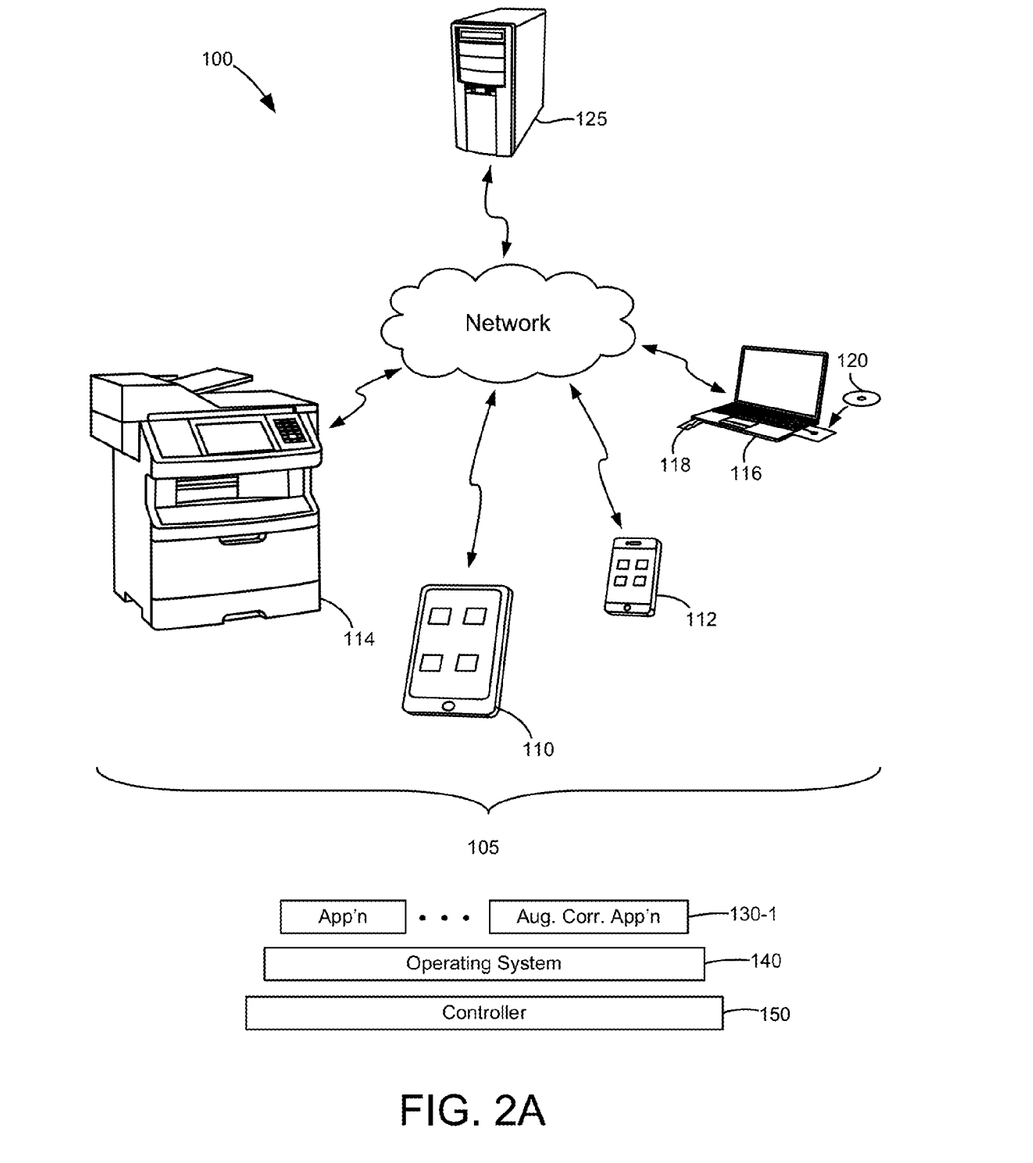
FIG. 2(a) is a diagram of a computing system environment for augmented image correlation, including image capture and display of the results of augmented image correlation in FIG. 2(b)

With reference to FIG. 2(a), a computing system environment 100 includes a plurality of computing devices 105. The devices are any of a variety, but tablets 110, smart phones 112, imaging devices 114, and laptops 116, etc. are contemplated. They communicate in a network N, such as a LAN or WAN and implicate the internet or intranets. One or more servers 125 reside in the environment and store executable instructions in memory that the computing devices communicate with to receive downloads of computing applications. The applications may also reside on computer readable media, such as a USB stick 118 or disk 120, etc. An operating system 140 configured on a physical controller 150, e.g., microprocessor, ASIC, etc., hosts the computing applications 130 on the computing devices. As described herein, the augmented correlation application 130-1 augments techniques of traditional image correlation and may communicate with still other computing applications 130-2 hosted on the operating system.

Figure 2B:
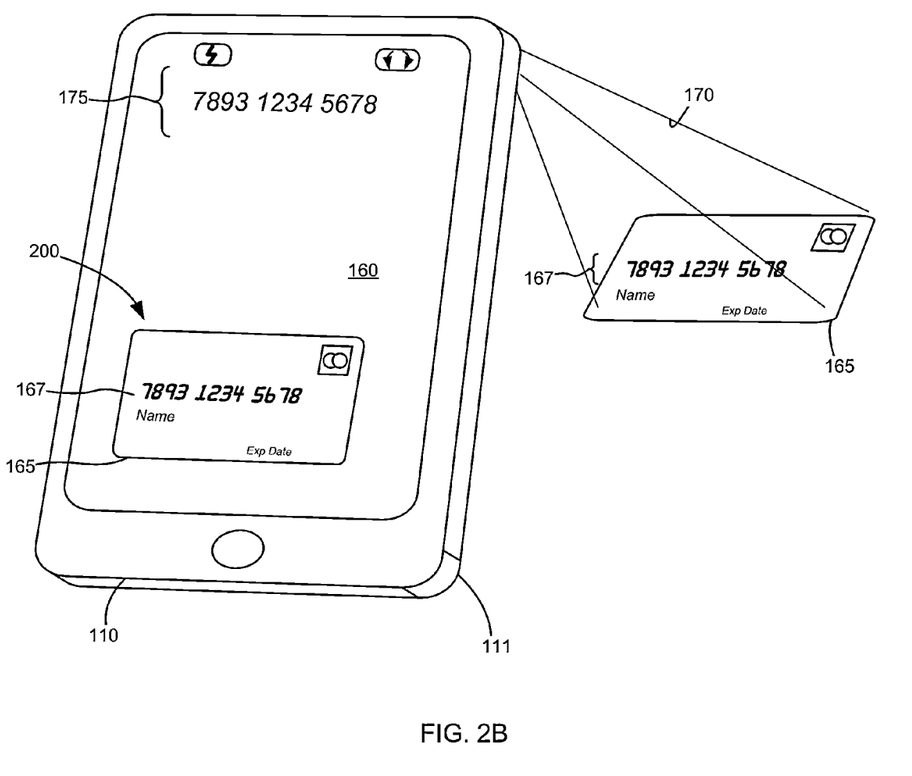

In FIG. 2(b), the augmented correlation application executes in a computing device in the form of a tablet 110. The tablet has a display 160 and a camera that captures images 170 (still or video) upon a user manipulating a housing 111 of the tablet, as is familiar. The camera captures an image of a banking card 165 (credit card, ATM card, debit card, etc.), or other images, including numerals 167 (e.g., embossed digits). Both the banking card 165 and numerals 167 are displayed 160 to the user of the tablet. The augmented correlation application recognizes objects 175 in the captured image, such as numerals 167, and also displays them to the user. The object recognition appears as a result of the following use-case example.

Figure 3A:
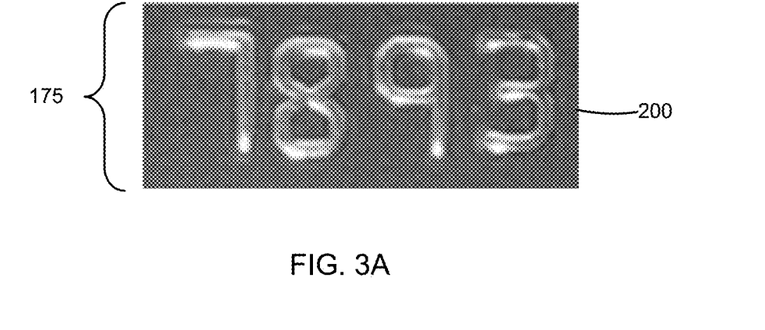
FIG. 3(a) is a capture of an image having objects in the form of numerals embossed as digits on a banking card.
Figure 3B:
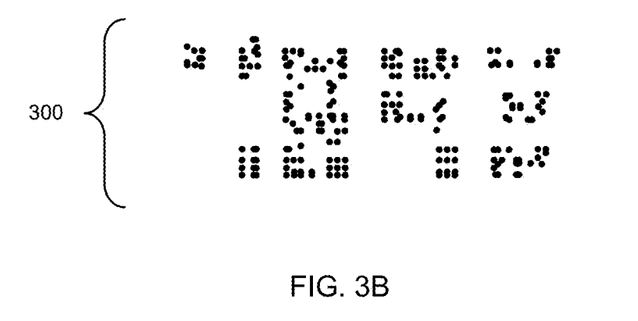
FIG. 3(b) is a diagrammatic view of pixels extracted from the image of FIG. 3(a) corresponding to corner features of the objects therein.
Figure 3C:
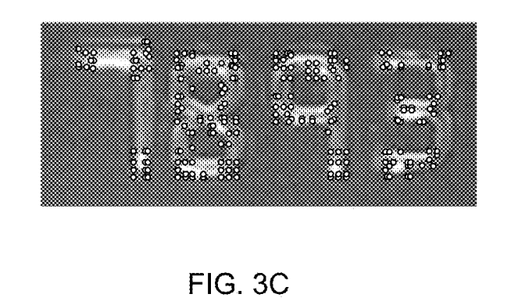
FIG. 3(c) is a diagrammatic view of FIG. 3(b) overlaid on FIG. 3(a)

With reference to FIGS. 3(a)-3(c), objects in images can be any of a variety, but FIG. 3(a) shows a capture of an image 200 having objects 175 in the form of numerals embossed as digits (7-8-9-3) on a banking card. FIG. 3(b) shows features 300 extracted from the objects, corresponding to corners of the objects. Other features could include delimiting items such as ridges, blobs, edges, points/regions of interest, etc. FIG. 3(c) shows the delimiting features of FIG. 3(b) overlaid on the numerals of FIG. 3(a).

Figure 4A:
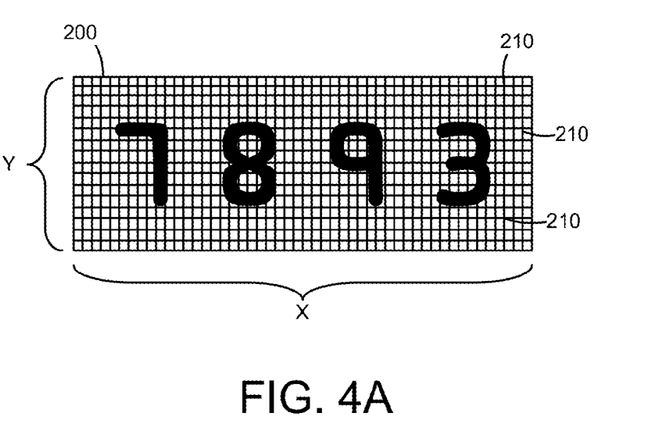
FIGS. 4(a)-4(d) are diagrammatic views in the comparison of pixels of a source image to pixels of templates, including comparing extracted features to features templates.
Figure 4B:
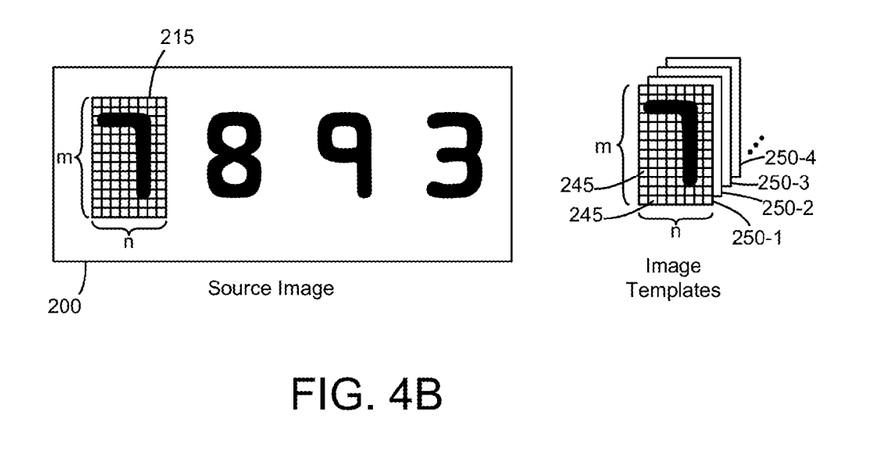

With reference to FIG. 4(a), an image captured for object recognition can be defined as a source image 200. The source has pluralities of pixels 210. The pixels are either on or off, binary, or represent a value, such as 0-255, in gray scale. The source may also define one color of many color planes (cyan, magenta, yellow, black or red, green, blue, etc.) that combine together to form a complete image. In FIG. 4(b), the source image 200 is searched by a search window 215. The window defines an m×n array of pixels, that is equal to or less than the array of Y×X pixels of the source image. In one instance, the m×n array is a square window of 60×60 pixels, but other sizes can be programmed. With every movement of the search window 215, its pixels are compared to predefined pixels 245 of pluralities of templates 250 to determine a best matching template therefore. As seen in FIG. 4(b), the search window 215 overlies the object in the form of the digit "7" and best matches to the template 250-1 defining a digit "7" in pixel form.

Figure 4C:
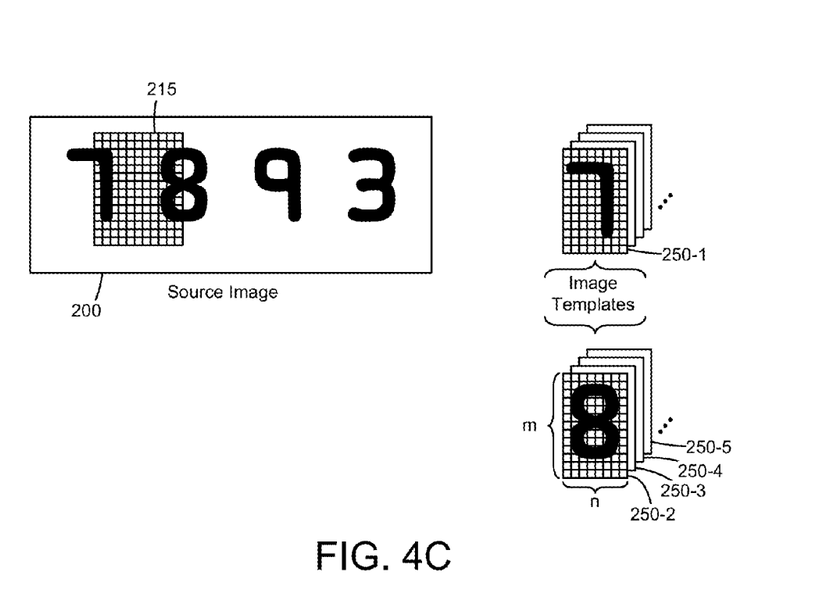

In contrast, FIG. 4(c) shows no exact match to the templates 250-1, 250-2 for the digits "7" and "8" when the position of the search window 215 in the source image 200 resides between digits "7" and "8." However, one template still defines a best match to the search window, but not as good as when scored in comparison to the example in FIG. 4(b). Usually, a highest algorithmic score results in the best match, as will be seen. Similarly, matches and best scores are obtained between the pixels of the search window 215 and those of the templates 250 when the search window resides at other positions in the source image. For best matching, it is preferred that the pixel array size m×n of the search window matches the array size m×n of the template, but need not necessarily do so.

Figure 4D:
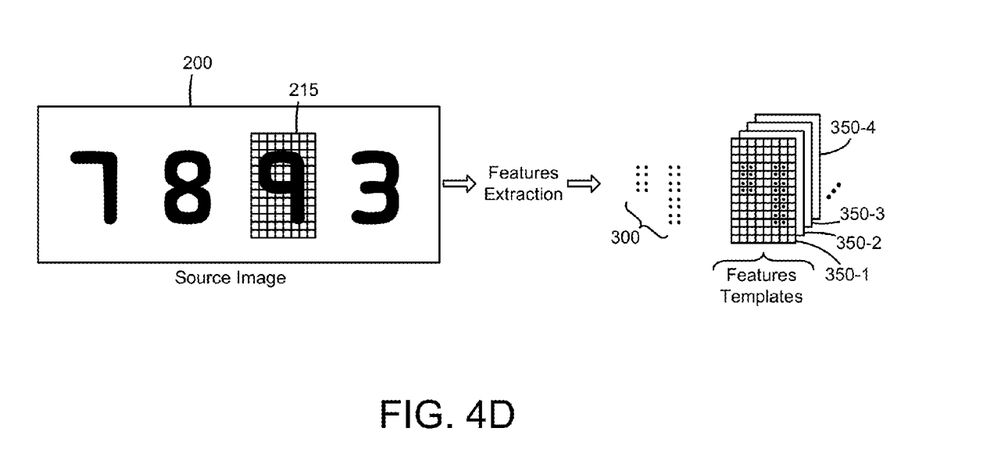

With reference to FIG. 4(d), delimiting features 300 of the object can be extracted from the pixels of the source image 200. In a variety of techniques, Canny, Sobel, Harris & Stephens, Laplacian/Difference of Gaussian, etc. can be used to extract the features of the objects. The features can be any defining characteristic, but edges, corners, points/regions of interest, blobs, ridges, or the like, are common. Once extracted, the features can be compared to templates of features 350 to identify best matches therefore, similar to the image template comparisons in FIGS. 4(b) and 4(c). Intuitively, the features templates 350 and the image templates 250 could be the same templates or different. Skilled artisans will note that features for a given digit will match well to the underlying digit as will its entirety of its object match well to the entirety of the template of its object. Of course, the features templates can be stand-alone templates noting only the features of an object, as noted in 350-1.

Figure 5:
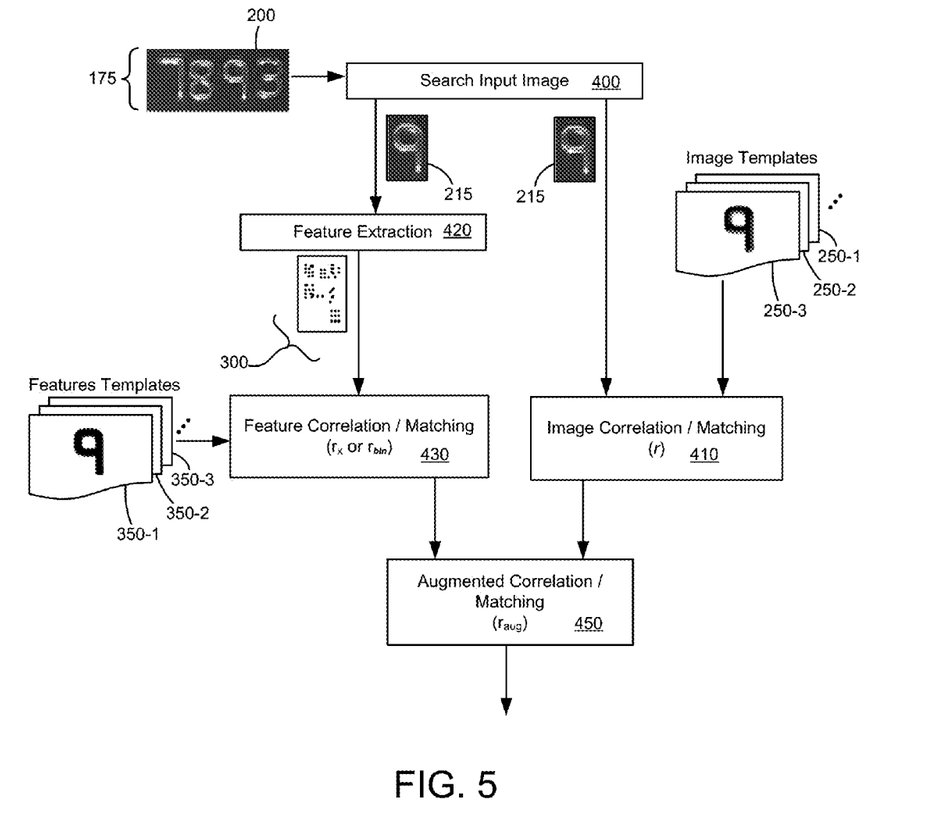
FIGS. 5-6 are flow charts according to embodiments of the present invention for correlating objects of images to templates of same and augmenting that with object features extracted from the images to obtain higher certainties of object recognition, including modification of templates using the extracted object features.

With reference to FIG. 5, the pixels of the source image 200 are searched 400 by advancing a search window 215 there through. At instances throughout the source image, the pixels of the search window are compared to image templates 250. They are correlated to one another 410 and a best match selected. A highest score of the following algorithm, r, reveals one example of the best match between the pixels of the source image and that of the template:

Real-Valued Correlation, r, (Eqn. 1)

$$r = \frac{\sum_m \sum_n (X_{mn} - \overline{X})(Y_{mn} - \overline{Y})}{\sqrt{\left(\sum_m \sum_n (X_{mn} - \overline{X})^2\right)\left(\sum_m \sum_n (Y_{mn} - \overline{Y})^2\right)}}$$

where $X_{mn}$ represents pixels in the m×n search window 215, while $Y_{mn}$ represents pixels in the m×n image templates 250. Examples of real-valued template images are shown in FIGS. 1(d) and 1(e). The arithmetic means of $X_{mn}$ and $Y_{mn}$ are $\overline{X}$ and $\overline{Y}$, respectively.

Upon extracting features delimiting the objects they represent, 420, the features 300 are correlated 430 to features templates 350 and a best match selected therefore. A highest score of the following algorithm, $r_{bin}$, reveals the best match between the features of the objects of the source image and that of the features template:

Binary Correlation, $r_{bin}$, $\quad r_{bin} = \frac{NN_{XY} - N_X N_Y}{(N_X(N-N_X))(N_Y(N-N_Y))}$ (Eqn. 2)

where N is the total number of pixels in an m×n search window 215, $N_X$ is the number of binary "on" pixels in that search window for the features 300, $N_Y$ is the number of binary "on" pixels in the features template 350, and $N_{XY}$ is the number of pixels simultaneously "on" (logic ANDed) in both the features template 350 and the features extracted 300 from the source image. Examples of features of objects extracted from a source image are given in FIG. 3(b).

Alternatively, the feature correlation/matching 430 can be given as:

$r_x = N_{XY}/N$ (Eqn. 3)

where $N_{XY}$ is the number pixels that are simultaneously "on" in the features extracted 300 from the source image, as shown in FIG. 3(b), and the features template 350.

In turn, the augmented correlation 450 combines together the traditional image correlation/matching (r) with the feature correlation/matching ($r_{bin}$ or $r_x$) to arrive at a higher confidence of correlation/matching than simply using the traditional image techniques. Mathematically, the augmented correlation, $r_{aug}$, could be any linear combination of r and $r_{bin}$, but specifically, $r_{aug} = Ar + (1-A)r_{bin}$, $0 < A < 1$ or any of them augmented by additional term(s) such as:

$r_{aug} = Ar + (1-A)r_x$, $0 < A < 1$

Since basic correlation scores can be positive or negative, the absolute value of the correlation score can be used to permit using inverted templates as well. Similarly, image transforms or deformable models can take care of changes to the object such as scale, rotation, distortion, etc., to bring a certain template into the highest score with the deformed object.

Figure 6:
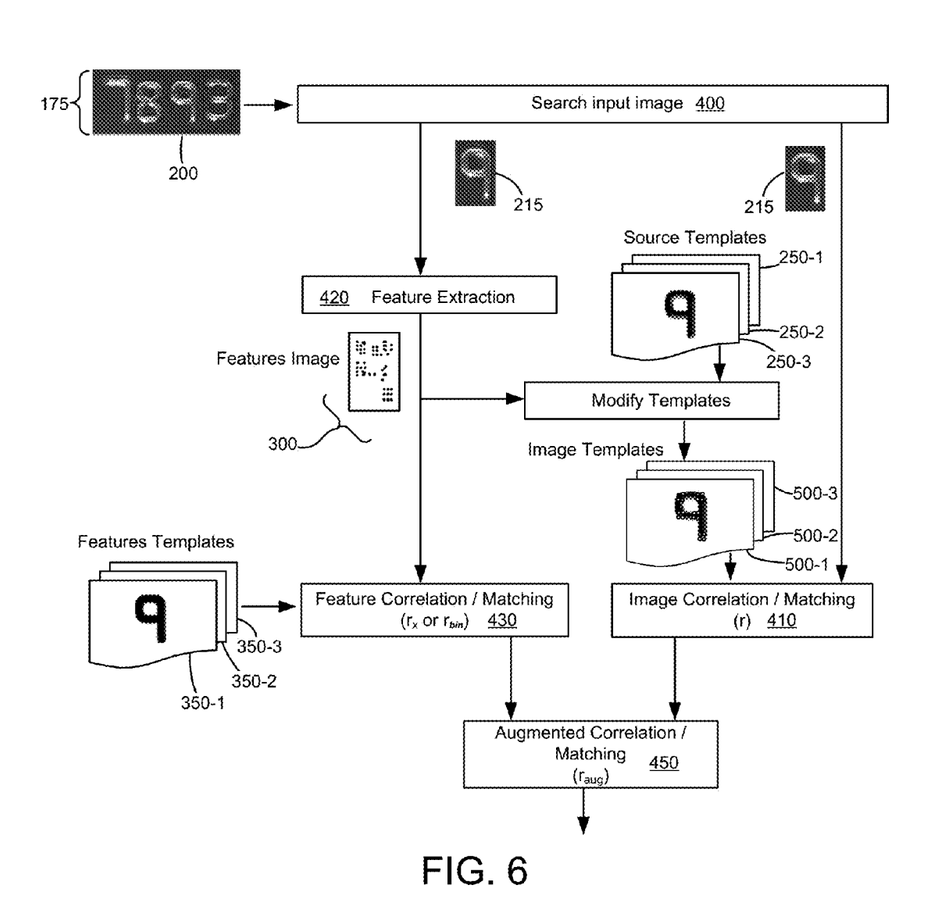
Figure 7A:
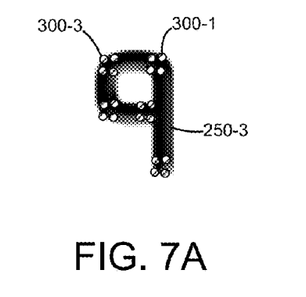
FIGS. 7(a)-7(b) are sample templates of objects corrupted with pixels extracted from a source image corresponding to the objects.
Figure 7B:
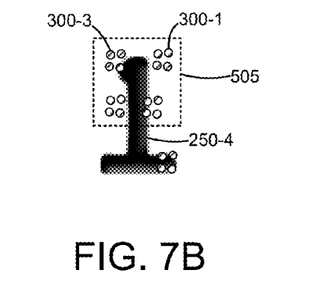

With reference to FIG. 6, another example of augmented correlation contemplates searching a source image 200 and comparing searched pixels to templates for correlation. This includes comparing extracted features 300 to features templates 350, similar to FIG. 5, but with modification of templates 250 using the extracted features 300. In this way, modified image templates 500 are used in correlation at 410, vice original source templates 250. As seen in FIGS. 7(a) and 7(b), templates 250-3 for the digit "9" and 250-4 for the digit "1," get either better matched or worse matched to the object. With features extracted 300 for the digit "9" when overlaid on the templates for digits "9" and "1," the template for the digit "9" still matches well to the object in the form of the digit "9" as pixels 300-1 and 300-3, for example, overlay well on the digit "9." However, when those same pixels 300-1 and 300-3 are overlaid on the digit "1" template, they corrupt the template 250-4 especially in the region noted by box 505. Corruption can take the form of pixels 245 (FIG. 4(b)) being modified from binary on to off, or vice versa, or by substituting an original pixel value with a wholly different pixel value that represents the extracted feature 300. As a result, when features 300 are extracted corresponding to the template 250-3 for the digit "9" it will still score better (Eqn. 1) as template 500-1, in some cases much better, than it otherwise would score in comparison to the template 500-4 for the digit "1" having intentional corruption introduced by features 300.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. In a computing system environment, a method for recognizing objects in images defined by pixels, comprising:
    searching pixels of a source image;
    correlating the searched pixels to a plurality of predefined image templates of pixels and selecting a best matching image template therefore;
    extracting certain pixels from the source image that delimit features of the objects;
    correlating the extracted certain pixels to a plurality of predefined feature templates of pixels and selecting a best matching feature template therefore; and
    combining together results of said correlating; and display to a user.

2. The method of claim 1, further including digitally capturing the source image with a camera.

3. The method of claim 1, wherein the searching pixels of the source image further includes advancing a window through the pixels of the source image, the window having an m×n array of pixels corresponding to an m×n array of the pixels in the plurality of predefined image templates.

4. The method of claim 1, where the extracting certain pixels from the source image includes extracting feature corners of the objects in the source image.

5. The method of claim 1, wherein the plurality of predefined image templates is the same as the predefined features templates.

6. The method of claim 1, wherein the plurality of image templates include pixel values obtained from the certain pixels said extracted from the source image.

7. The method of claim 1, wherein the plurality of image templates are obtained by corrupting original pixel values of a plurality of source templates with the certain pixels extracted from the source image and changing one or more pixel values therefore.

8. The method of claim 1, wherein the correlating the extracted certain pixels to the plurality of predefined feature templates of pixels further includes determining numbers of simultaneously on pixels there between.

9. The method of claim 1, wherein either the predefined image templates or the predefined features templates are inverted versions of templates defining the objects.

10. In a computing system environment, a method for recognizing objects in images defined by pixels, comprising:
   searching pixels of a source image;
   extracting certain pixels from the source image that delimit features of the objects;
   correlating the extracted certain pixels to a plurality of predefined feature templates of pixels;
   modifying one or more of a plurality of image templates of pixels with the certain pixels said extracted from the source image to obtain a plurality of modified templates, including corrupting the pixels of the one or more plurality of image templates by changing one or more pixel values therefore;
   correlating the searched pixels of the source image to the plurality of modified templates of pixels; and
   combining together results of said correlating; and display to a user.

11. The method of claim 10, further including digitally capturing the source image with a camera.

12. The method of claim 10, wherein the searching pixels of the source image further includes advancing a window through the pixels of the source image, the window having an m×n array of pixels corresponding to an m×n array of the pixels in the plurality of modified templates.

13. The method of claim 10, wherein the extracting certain pixels from the source image includes extracting feature corners of the objects in the source image.

14. A computing device that recognizes objects in images defined by pixels, comprising:
   a housing;
   a camera activated by a user manipulating the housing; and
   a controller in the housing hosting a computing application with executable instructions operative for
   receiving an image captured by the camera;
   searching pixels of the image;
   correlating the searched pixels to a plurality of image templates stored in memory for access by the controller;
   extracting certain pixels from the image that delimit features of the objects; and
   correlating the extracted certain pixels to a plurality of feature templates stored in memory for access by the controller; and
   selecting a best object from the correlated searched pixels and the correlated extracted certain pixels and combine together results of the correlating;
   and a display for showing the user the best object.

15. The computing device of claim 14, wherein the housing defines a computing tablet, a smart phone, or an imaging device.

16. The computing device of claim 14, wherein the objects include numerals on a user banking card and the display shows the both the banking card as captured by the camera and the objects after execution of the computing application hosted on the controller.

17. An augmented correlation application available on a computer readable medium or hosted on a computing device having memory for download onto a controller of an imaging device or a mobile computing device comprising executable code operative for extracting objects and delimiting features thereof from a source image for comparison to pluralities of templates of same and selecting best matches, and combining together results thereof.

18. The augmented correlation application of claim 17, further operative for searching pixels of the source image and correlating the searched pixels to pixels of the pluralities of templates.

19. The augmented correlation application of claim 18, further operative for modifying one or more of the pluralities of templates with the extracted delimiting features, including corrupting pixels of the one or more pluralities of templates by changing one or more pixel values therefore.

20. The augmented correlation application of claim 17, further operative for causing display to a user of the imaging device of mobile computing device the extracted objects upon execution of the application by the controller.

* * * * *